United States Patent

Small

[11] Patent Number: 6,145,012
[45] Date of Patent: Nov. 7, 2000

[54] APPARATUS AND METHOD FOR EFFICIENTLY UPDATING FILES IN COMPUTER NETWORKS

[75] Inventor: Hunter Small, San Luis Obispo, Calif.

[73] Assignee: Veritas Software Corporation, Mountain View, Calif.

[21] Appl. No.: 09/173,481

[22] Filed: Oct. 14, 1998

[51] Int. Cl.[7] .................................................. G06F 15/16
[52] U.S. Cl. ........................... 709/246; 709/204; 709/219
[58] Field of Search .................................... 709/204, 205, 709/246, 217, 218, 219; 707/10, 201, 203, 204, 511, 513, 531

[56] References Cited

U.S. PATENT DOCUMENTS

| Re. 35,861 | 7/1998 | Queen | 707/511 |
|---|---|---|---|
| 4,641,274 | 2/1987 | Swank | 707/531 |
| 4,807,182 | 2/1989 | Queen | 707/511 |
| 5,446,888 | 8/1995 | Pyne | 707/10 |
| 5,479,654 | 12/1995 | Squibb | 707/201 |
| 5,559,991 | 9/1996 | Kanfi | 707/203 |
| 5,574,906 | 11/1996 | Morris | 707/203 X |
| 5,630,116 | 5/1997 | Takaya et al. | 707/201 |
| 5,634,052 | 5/1997 | Morris | 709/204 X |
| 5,721,907 | 2/1998 | Pyne | 707/10 |
| 5,729,735 | 3/1998 | Meyering | 707/10 |
| 5,729,743 | 3/1998 | Squibb | 707/203 |
| 5,745,906 | 4/1998 | Squibb | 707/203 |
| 5,813,017 | 9/1998 | Morris | 707/204 |
| 5,893,119 | 4/1999 | Squibb | 707/203 |
| 5,898,836 | 4/1999 | Freivald et al. | 707/513 |

*Primary Examiner*—Ahmad F. Matar
*Assistant Examiner*—Patrice Winder
*Attorney, Agent, or Firm*—Carr & Ferrell LLP

[57] ABSTRACT

A method of transferring a file is executed by a client computer under control of a first program portion and is also executed by a server computer under control of a second program portion. The server computer stores a baseline file having baseline data. The client computer stores a local file that is a modified baseline file having modified data. The client computer is coupled to the server computer. First tier baseline reference keys are generated for and associated with first tier subsets of the baseline data stored in the baseline file. First tier client reference keys are generated for and associated with first tier subsets of the modified data stored in the local file. When the associated reference keys match, one of the first tier subsets of baseline data is transferred to a destination file stored on the server computer. When the associated first tier baseline and client reference keys do not match, a second tier baseline reference key is generated for and associated with a second tier baseline subset of one of the first tier subsets of the baseline data. At least one second tier client reference key is generated for and associated with a second tier client subset of one of the first tier subsets of the modified data. The second tier baseline subset or second tier client subset is transferred to the destination file based on the associated second tier baseline and client reference keys.

20 Claims, 11 Drawing Sheets

152 →

| 154 | 156 | 158 | 160 |
|---|---|---|---|
| Metasegment Number | File Offset | Metasegment Length | Reference Key Value |

| 164 | 166 | 168 | 170 |
|---|---|---|---|
| Segment Number | File Offset | Segment Length | Reference Key Value |

FIG. 6

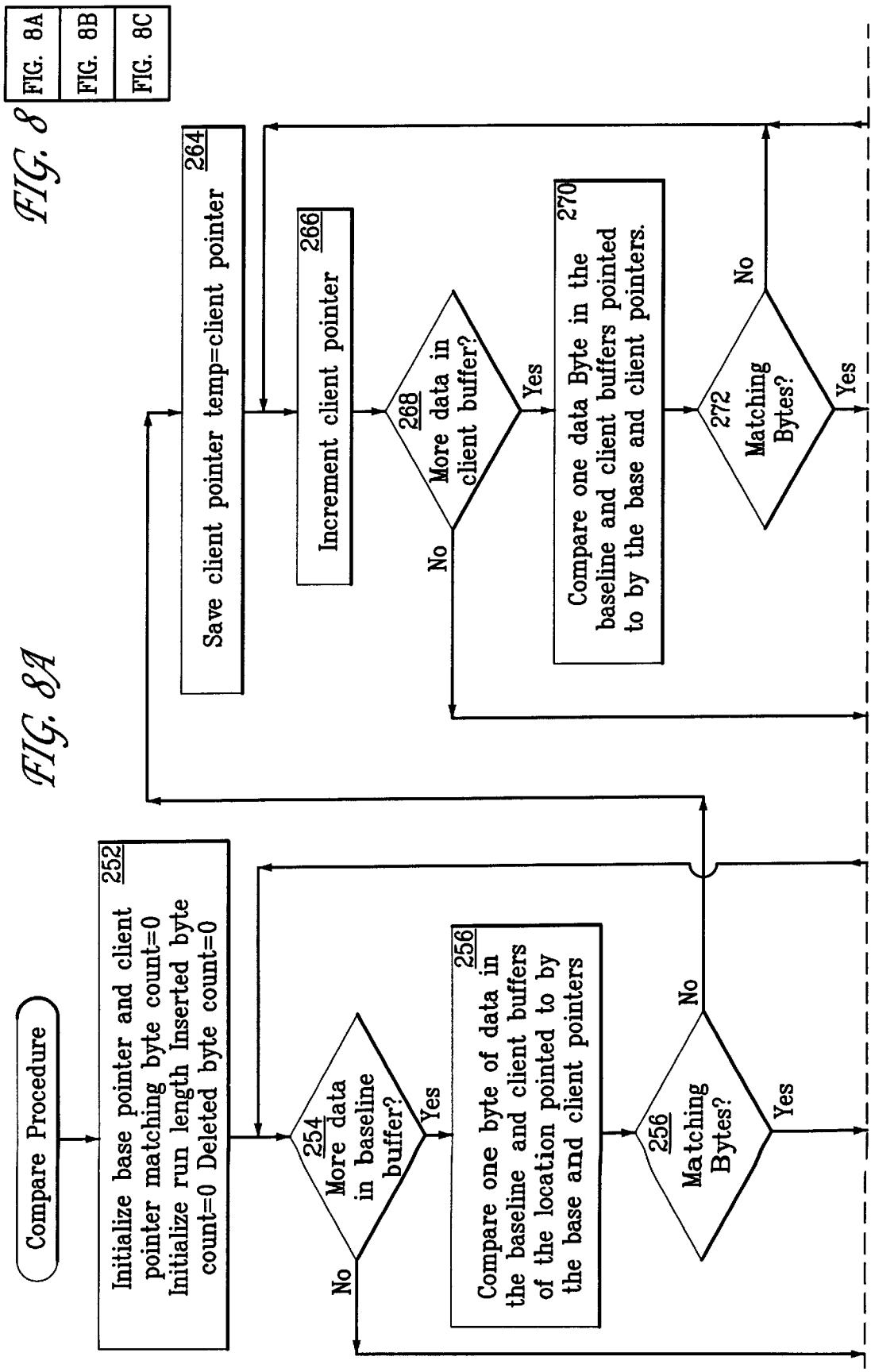

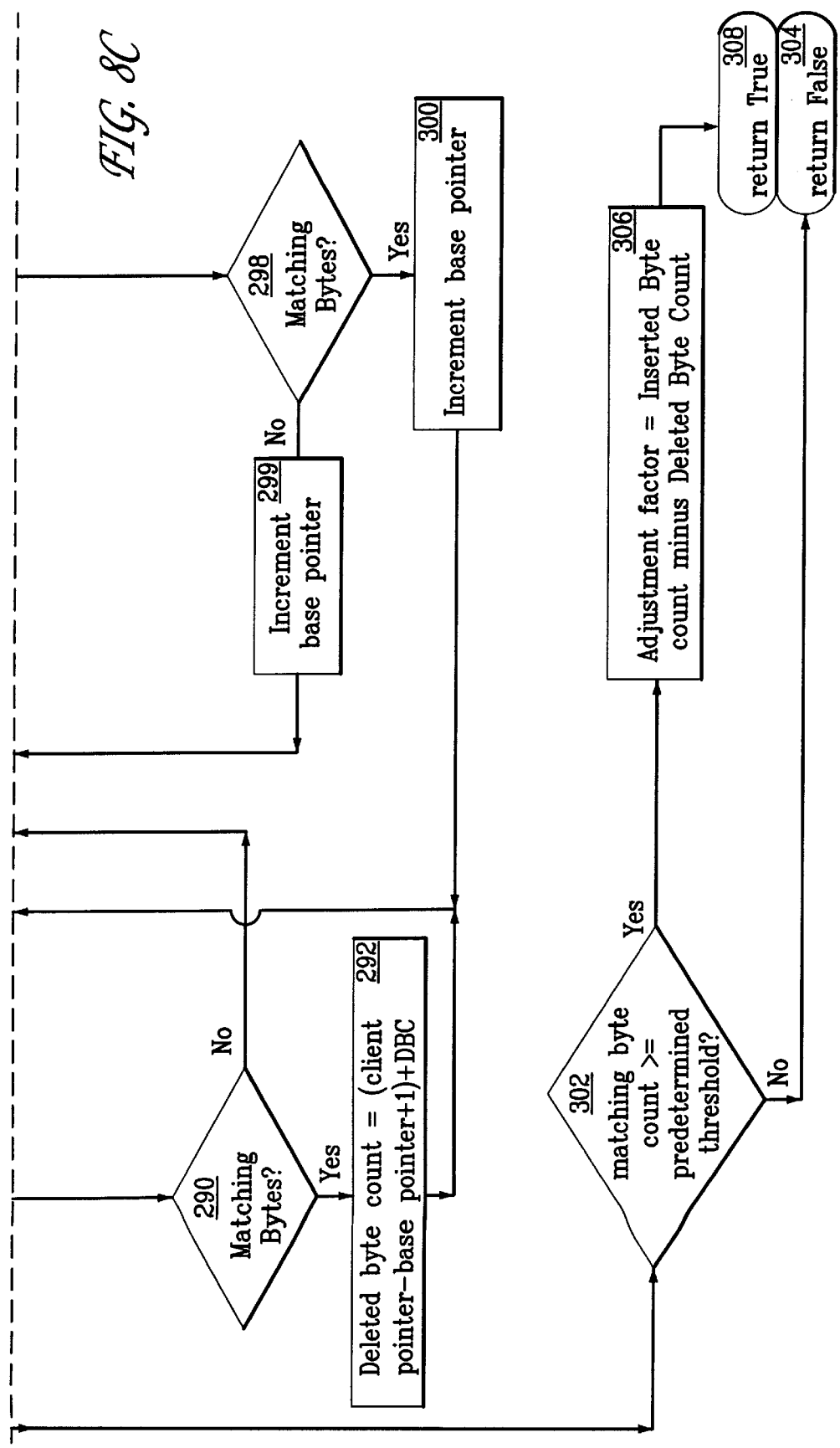

APPARATUS AND METHOD FOR EFFICIENTLY UPDATING FILES IN COMPUTER NETWORKS

BRIEF DESCRIPTION OF THE INVENTION

This invention relates generally to transferring computer files in computer networks. More particularly, this invention relates to a technique for updating a file stored in a first computer so that it replicates a corresponding modified file on a second computer.

BACKGROUND OF THE INVENTION

In client-server computer systems, information that is stored in a file on a remotely located server computer is often copied to a file on a local client computer. A user then updates the copied file on the local client computer. Thereafter, the two copies of the file do not match; and the user subsequently copies the updated file back to a destination file on the server computer.

Typically a network connects the client computer to the remote computer. Transferring files over the network between client and server computers consumes network resources and takes time. When copying the updated file on the client computer back to the destination file on the server computer, network traffic is increased. Typically, only portions of files are updated or changed. Therefore, sending unchanged contents of the file increases the amount of time and consumes network resources.

It would be highly desirable to develop a technique that transfers a portion of the updated file on the client computer to the destination file on the server computer to increase the speed of the file transfer and reduce consumption of valuable network resources.

SUMMARY OF THE INVENTION

The method of the invention includes the step of transferring a modified portion of a modified file from a client computer to a destination file on a server computer. The server computer also has a baseline file which is an earlier version of the modified file. A difference engine identifies portions of the modified file that differ from corresponding portions of the baseline file. The difference engine causes the modified portions of the modified file to be transferred to the destination file on the server computer, while unmodified portions of the modified file are transferred from the baseline file to the destination file.

In particular, a method of transferring a file is executed by a client computer under control of a first program portion and is also executed by a server computer under control of a second program portion. The server computer stores a baseline file having baseline data. The client computer stores a local file that is a modified baseline file having modified data. The client computer is coupled to the server computer. First tier baseline reference keys are generated and associated for first tier subsets of the baseline data stored in the baseline file. A predetermined key defining method is used to generate the first tier baseline reference keys from at least a portion of the associated first tier subset of the baseline data. First tier client reference keys are generated and associated for first tier subsets of the modified data stored in the local file using the key defining method. The first tier client reference keys are generated from at least a portion of the associated first tier subset of the modified data. One of the first tier subsets of baseline data is transferred to the destination file stored on the server computer when the associated first tier baseline and client reference keys match. At least one second tier baseline reference key is generated and associated for at least one second tier baseline subset of one of the first tier subsets of the baseline data. At least one second tier client reference key is generated and associated for at least one second tier client subset of one of the first tier subsets of the modified data, when the associated first tier baseline reference key and the associated first tier client reference key do not match. At least one second tier baseline subset or the at least one second tier client subset is transferred to the destination file, based on the associated second tier baseline reference key and the associated second tier client reference key.

The invention more efficiently transfers data across the network by copying unmodified portions of the baseline file on the server to the destination file. In this way, performance is improved. The invention thereby more effectively utilizes the network. Another advantage is that the invention can be utilized with multiple clients and a single server, or multiple clients and multiple servers.

BRIEF DESCRIPTION OF THE DRAWINGS

For a better understanding of the invention, reference should be made to the following detailed description taken in conjunction with the accompanying drawings, in which:

FIG. 5 illustrates a metasegment array in accordance with an embodiment of the invention.

FIG. 6 illustrates a segment array in accordance with an embodiment of the invention.

FIGS. 8A, 8B and 8C illustrate the operation of one embodiment of a compare procedure that determines an adjustment factor.

Like reference numerals refer to corresponding parts throughout the drawings.

DETAILED DESCRIPTION OF THE INVENTION

Figure 1:
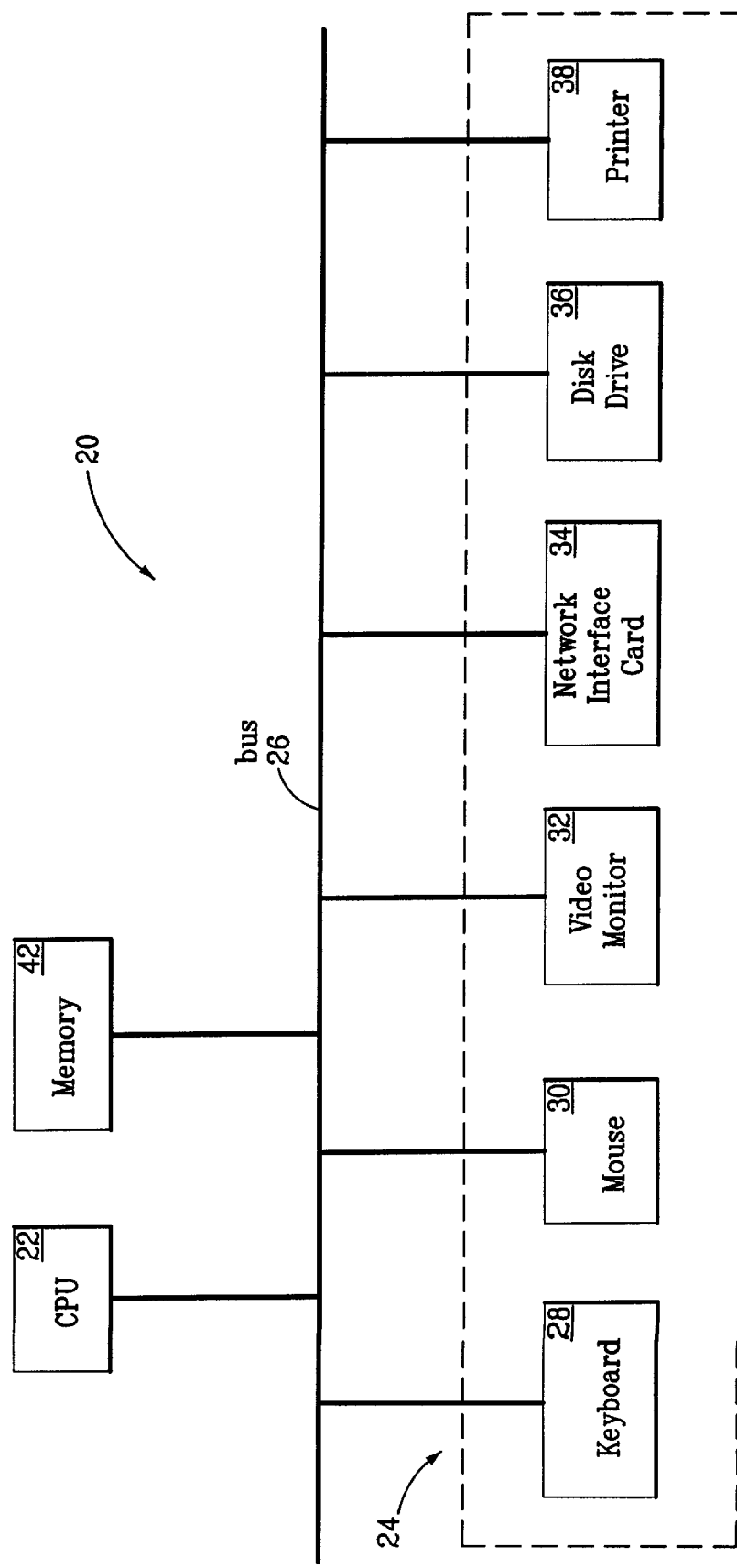
FIG. 1 illustrates a single computer constructed in accordance with an embodiment of the invention.

FIG. 1 illustrates a computer 20 constructed in accordance with an embodiment of the invention. The computer 20 includes a Central Processing Unit (CPU) 22 that communicates with a set of input/output devices 24 over a system bus 26. The input/output devices 24 include a keyboard 28, a mouse 30, a video monitor 32, a network interface card 34, a disk drive 36, a printer 38, etc. The CPU 22 is also connected to a memory (primary and/or secondary) 42 via the bus 26. The interactions between the CPU 22, the input/output devices 24, the system bus 26, and the memories 42 are known in the art. The present invention is directed toward the operation of these components in connection with transferring a file between a client computer and a server computer.

Figure 2:
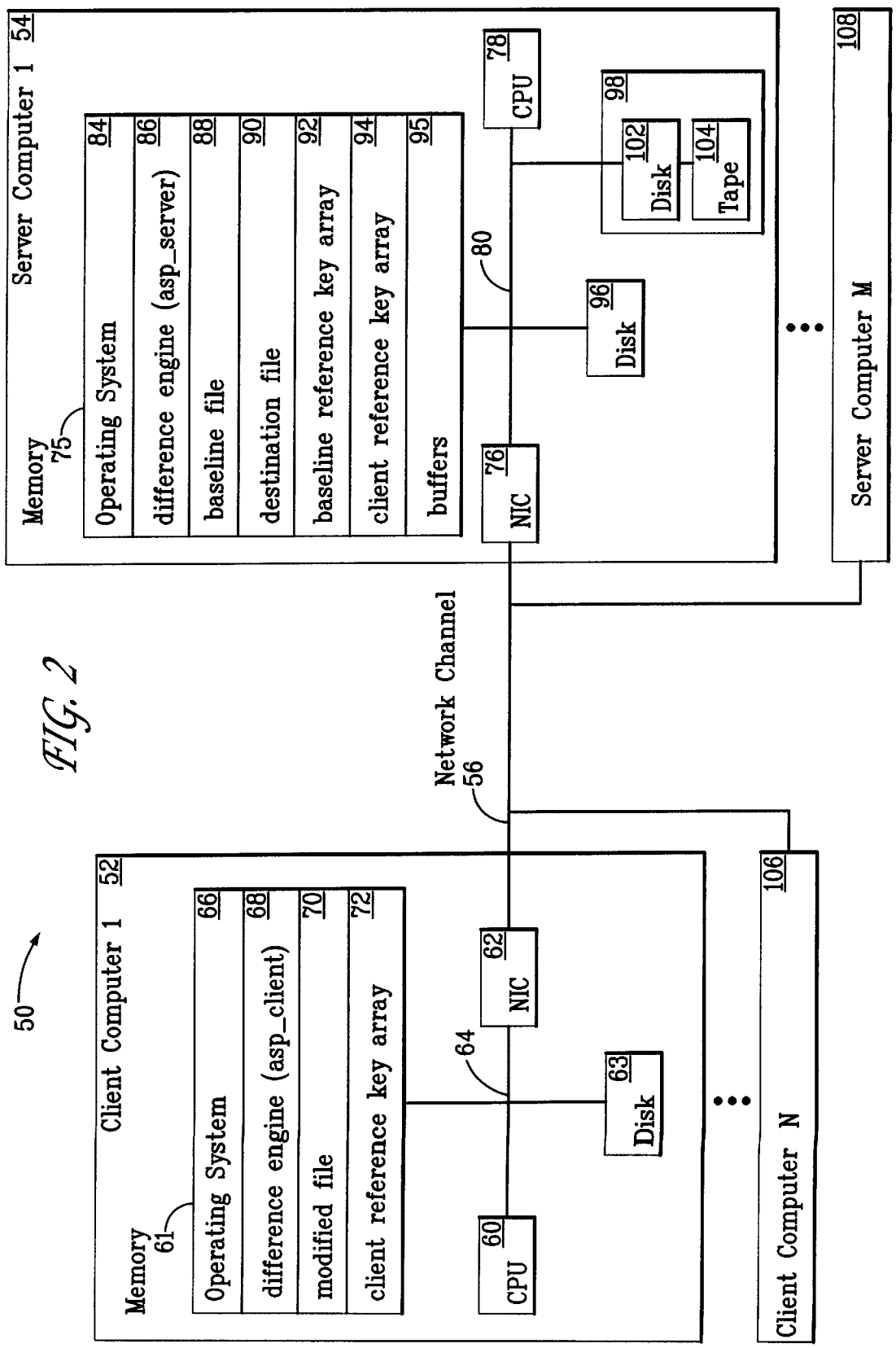
FIG. 2 illustrates a client/server computer network constructed in accordance with an embodiment of the invention.

FIG. 2 illustrates a client/server computer network 50 constructed in accordance with an embodiment of the invention. The computer network 50 includes a client computer 52 that communicates with a server computer 54 over a network channel 56. The client computer 52 includes a CPU 60, memory 61, network interface circuit 62 and disk drive 63 which communicate over a system bus 64. The client computer 52 also includes an operating system 66, a first portion of the difference engine 68 called active storage port—client (asp_client), a modified file 70 and a client reference key array 72 stored in the memory 61.

The server computer 54 includes a memory 75, network interface circuit 76 and a CPU 78 that communicate over a system bus 80. The memory 75 stores the operating system 84, a second portion of the difference engine 86 called active storage port—server (asp_server), a baseline file 88, a destination file 90, a baseline reference key array 92, a client reference key array 94 and buffers 95 including a baseline segment buffer (baseline buffer) and a client segment buffer (client buffer). The server computer 54 also has a disk drive 96 connected to the system bus 80. In an alternate embodiment, a hierarchical storage system 98 is connected to the system bus 80. The hierarchical storage system 98 includes a disk 102 and a tape drive 104.

The computer network 50 may include a large number of client computers 52 and server computers 54. In one embodiment, multiple (N) clients (Client Computer N) 106 are connected to the Server Computer 54 via the network channel 56. In another alternate embodiment, multiple (N) clients 106 are connected to multiple (M) servers (Server Computer M) 108 via the network channel 56. Preferably the network channel is the internet using TCP/IP protocol.

Possible architectures in which the present invention may be used have now been described. Attention presently turns to a discussion of the processing executed by the method of transferring files of the invention.

In the present invention, the server computer 54 stores a file, called the baseline file 88. At the client computer 52, a user makes a local copy of the baseline file 88, modifies the baseline file and stores the modified file 70 in memory 61. The client computer 52 executes a first program portion (asp_client) 68 and the server computer executes a second program portion (asp_server) 86 of the difference engine. The first and second program portions control the client and server computers, respectively, to transfer the modified file on the client computer to the destination file on the server computer.

The present invention provides a noteworthy technique of generating the destination file 90 on the server computer 54, that matches a more recent copy of the modified file 70 on the client computer, without transferring the entire contents of the modified file 70 to the server computer 54 via the network channel 56. The present invention identifies subsets of the data in the modified file 70 having bytes that were changed, added or deleted, and transfers those identified subsets of data to the server computer 54 to reduce the amount of data transmitted over the network channel 56. In a network environment, the invention significantly reduces the amount of network traffic. Because the invention uses the client/server architecture, performance gains are realized through concurrent processing. The present invention is especially useful during a backup operation of the files on the client computer 52 to the server computer 54. However, the invention is not meant to be limited only to backup operations between client and server computers and can be used in other file transfer operations.

Figure 3:
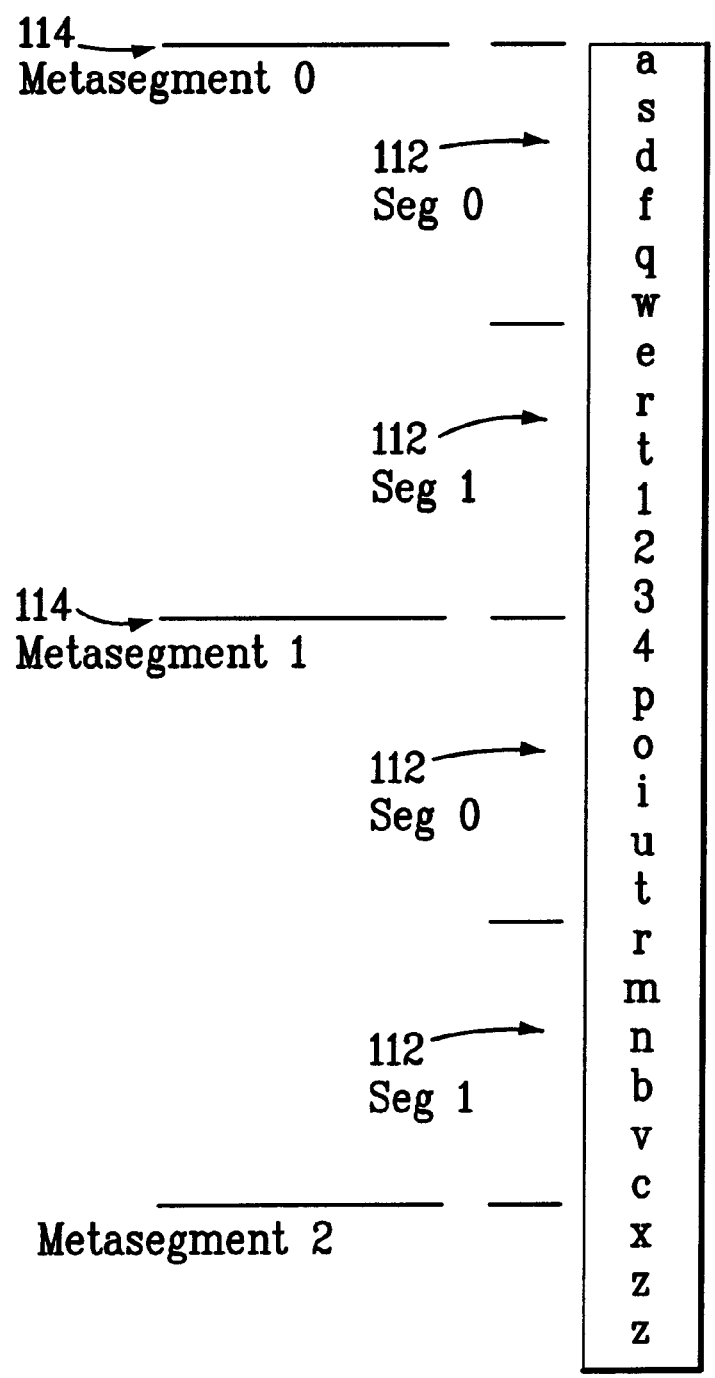
FIG. 3 illustrates an exemplary baseline file organized into segments and metasegments.

In FIG. 3, the contents or bytes of an exemplary baseline file 88 are organized into segments 112. A segment 112 is a fixed size portion of a file. In FIG. 3, the segments 112 have six bytes. A file can have any number (N) of segments 112. The number of segments 112 is determined by dividing the total number of bytes stored in the file (total file size) by the number of bytes in each segment (segment size). In an alternate embodiment, the segment size is variable such that the segments of the baseline file have different numbers of bytes. The invention has been implemented with a segment 112 that has 4K (4,096) bytes.

A metasegment 114 is a group or set of (N) contiguous segments 112. The number of segments 112 in a metasegment 114 is configurable. In FIG. 3, the metasegments 114 have two segments. The invention has been implemented with a metasegment that has 32 segments, therefore the metasegment has 128K (131,072) bytes.

Figure 4:
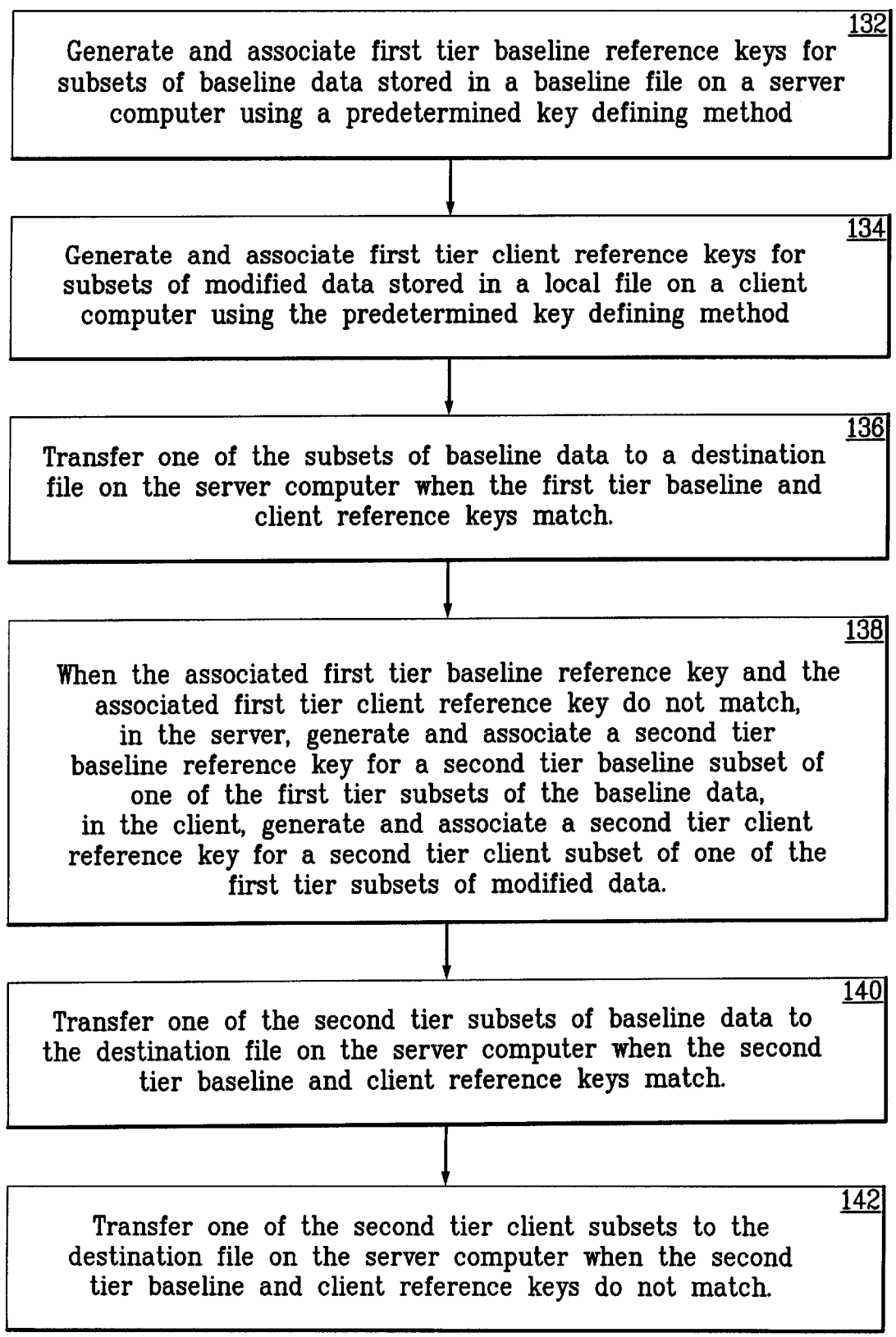
FIG. 4 illustrates a general operation of one embodiment of the method of the present invention.

FIG. 4 provides an overview of the method of the present invention. In step 132, first tier baseline reference keys are generated and associated for first tier subsets of the baseline data such as metasegments stored in the baseline file. A predetermined key defining method generates the first tier baseline reference keys from at least a portion of the baseline data of the associated first tier subset. In particular, the key defining method generates a cyclic redundancy code (CRC) value for the associated baseline data. Similarly, in step 134, first tier client reference keys are generated and associated for first tier subsets of the modified data stored in the local file using the key defining method. The first tier client reference keys are generated from at least a portion of the associated first tier subset of the modified data. In step 136, one of the first tier subsets of baseline data is transferred to a destination file stored on the server computer when the associated first tier baseline and client reference keys match. In step 138, when the associated first tier baseline and client reference keys do not match in the server, at least one second tier baseline reference key is generated for and associated with at least one second tier baseline subset, such as a segment of one of the first tier subsets of the baseline data. In addition, in the client, at least one second tier client reference key is generated for and associated with at least one second tier client subset of one of the first tier subsets of the modified data. In steps 140 and 142, at least one second tier baseline subset or the at least one second tier client subset is transferred to the destination file, based on the associated second tier baseline and client reference keys.

In particular, in step 140, at least one second tier baseline subset is transferred to the destination file when the associated second tier baseline and client reference keys match. In step 142, at least one second tier client subset is transferred to the destination file when the associated second tier baseline and client reference keys do not match.

In a preferred embodiment, the metasegments are mutually exclusive such that data of the file is part of only one metasegment.

Referring to FIG. 5, a metasegment array 152 stores and associates the generated first tier subset of metasegment information. The metasegment array 152 stores the metasegment number 154, a file offset 156, the length of the metasegment in bytes 158 and the reference key value 160, such as the CRC value, for groups of metasegments making up the file. In an alternate embodiment, the metasegment array is generated for all metasegments making up the file at one time. A baseline metasegment array is generated for the baseline data in the baseline file. A client metasegment array is generated for the modified data in the modified file. The file offset 156 is a positional address of the first byte of the associated metasegment in the file with respect to the first byte of the file.

In an alternate embodiment, the reference key value 160 uses a predetermined key defining method such as digital signature encryption, and in particular MD4–128 bit. MD2, MD4 and MD5 are message-digest algorithms developed by Rivest, and are used in digital signature applications where a large message is compressed in a secure manner before being signed with a private key. All three algorithms generate a 128 bit message digest from a message of arbitrary length. While the structures of these algorithms are somewhat similar, the design of MD2 is quite different from that of MD4 and MD5. MD2 was optimized for 8-bit machines, whereas MD4 and MD5 were aimed at 32-bit machines.

FIG. 6 illustrates the method uses a segment array 162 to store and associate the generated second tier subsets of segment information. The segment array 162 stores the segment number 164, a file offset 166, the length of the segment in bytes 168 and the reference key value 170 for groups of segments making up a metasegment of interest. In an alternate embodiment, the segment array 162 is generated for all segments of the metasegment of interest. The file offset 166 is a positional address of the first byte of the associated segment in the file with respect to the first byte of the file. The reference key value is the CRC value generated using the same predetermined key defining method that was applied to the metasegments. In an alternate embodiment, a different key defining method is used to generate the reference key values for the segments. A first key defining method generates the reference key values for the metasegments and a second key defining method generates the reference key values for the segments.

Figure 7A:
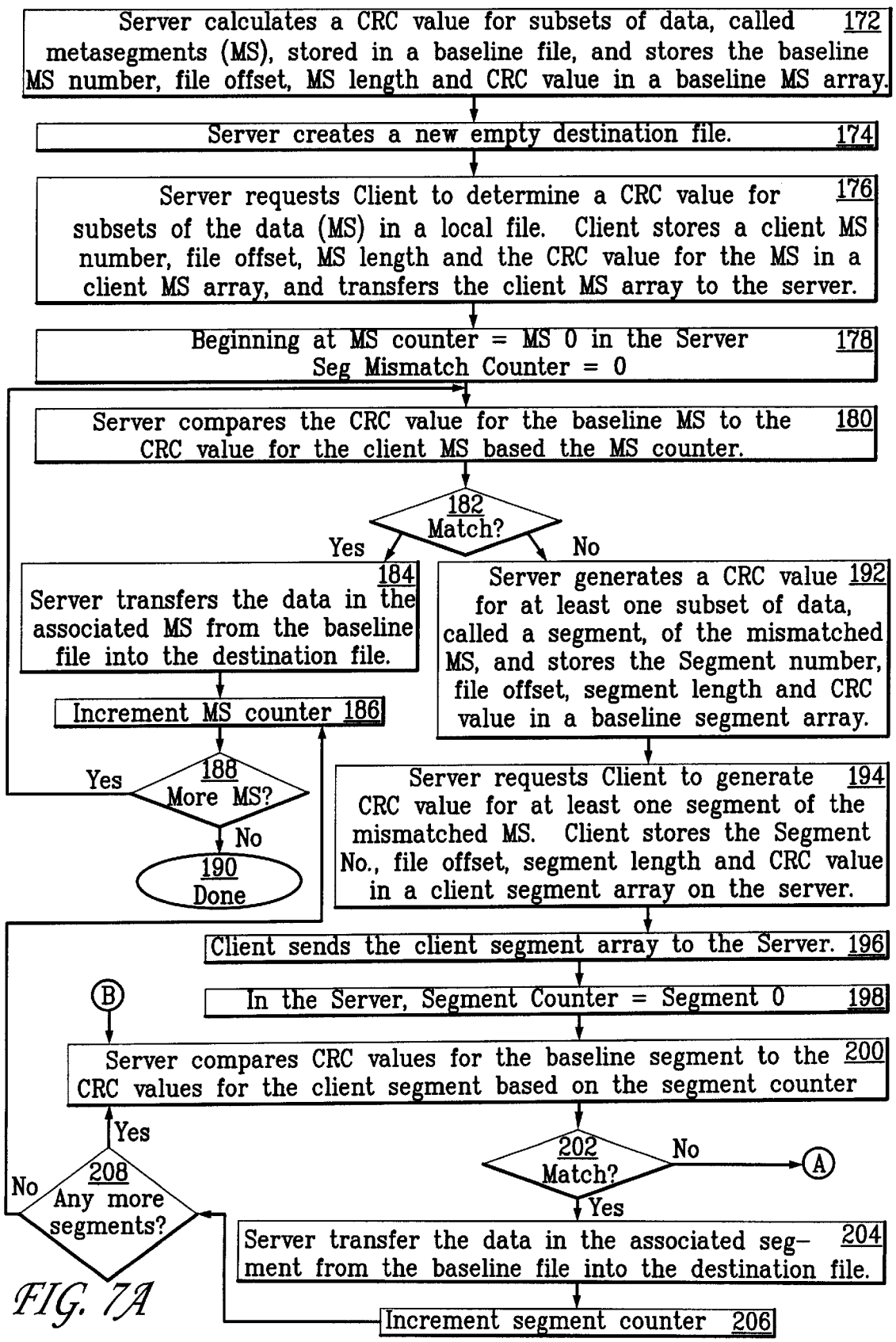
FIGS. 7A and 7B illustrate a detailed operation of the method of the present invention shown in FIG. 4.

Referring to FIG. 7A, a detailed flowchart of the operation of the difference engine is shown. In step 172, the server computer calculates a CRC value for subsets of data, such as the metasegments (MS), stored in the baseline file. The server computer also calculates the CRC value for at least a portion of the metasegment of the baseline file. Alternately, the server computer calculates the CRC values for all metasegments of the baseline file. The server computer stores the baseline metasegment number, a file offset, the length of the metasegment in bytes and the CRC value in the baseline metasegment array on the server. In step 174, the server computer creates a new empty destination file on the server computer.

In step 176, the server computer requests that the client computer determine a CRC value for subsets of the data (metasegments) in the local or modified file. The client computer generates, populates and stores the client metasegment array with the metasegment number, file offset, metasegment length and CRC value for at least a portion of the metasegments making up the modified file. The client metasegment array is stored on the client computer. The client computer transfers the client metasegment array to the server computer.

In step 178, the server computer initializes a metasegment counter to zero to point to the first metasegment in the baseline and client metasegment arrays. The server computer also initializes a segment mismatch counter to zero. The segment mismatch counter is subsequently used to terminate the execution of the method of the present invention if the number of segment mismatches exceeds a predetermined bail-out threshold.

In step 180, the server computer compares the CRC values for the current metasegment pointed to by the metasegment counter in the baseline metasegment array and client metasegment array.

Step 182 determines if the CRC values match. If so, in step 184, the server computer copies or transfers the data associated with the matching metasegment from the original, baseline file on the server to the destination file, also on the server. Step 186 increments the metasegment counter. Step 188 determines if there are any more metasegments to process. If so, the process proceeds to step 180. If not, the process ends at step 190.

However, if in step 182, the CRC values do not match, in step 192, the server computer generates a CRC value for at least one subset of data, such as a segment, of the metasegment of the baseline file having the mismatched CRC values. In particular, the server computer generates a baseline segment array storing the segment number, file offset, segment length and CRC value, as shown in FIG. 6, for at least a portion of the segments. In an alternate embodiment, the server computer generates a baseline segment array with CRC values for all segments of the metasegment of the baseline file having the mismatched CRC values.

In step 194, the server computer requests that the client computer generate CRC values for at least one segment of the metasegment of the modified file having the mismatched CRC value. In particular, the client computer generates a client segment array storing the segment number, file offset, segment length and CRC value, as shown in FIG. 6, for at least a portion of the segments. In an alternate embodiment, the server computer generates CRC values for all segments of the metasegment of the modified file having mismatched CRC values.

In step 196, the client computer sends or transfers the generated client segment array to the server computer. The server computer then begins a segment-by-segment comparison to identify matching and mismatching segments using the CRC values from the baseline and client segment arrays. In step 198, the server computer sets a segment counter equal to zero to point to the first segment in the baseline and client segment arrays. In step 200, the server computer compares the CRC values for the segment pointed to by the segment counter of the baseline and client segment arrays. Step 202 determines if the CRC values match. If so, in step 204, the server computer transfers or copies the data from the associated segment of the baseline file on the server into the destination file on the server. Step 206 increments the segment counter. Step 208 determines if there are more segments to compare. If not, step 208 proceeds to step 186 to process the next metasegment. If so, step 208 proceeds to step 200 to compare the CRC values for the next segment.

However, if in step 202, the compared CRC values for the segment do not match, in step 210, the segment mismatch counter (SMC) is incremented. Step 212 compares the segment mismatch counter to a predetermined bail-out threshold. If the segment mismatch counter equals the predetermined bail-out threshold, in step 214, the server copies or transfers the remaining data from the modified file on the client computer to the destination file on the server computer. In step 216, the process ends.

If the predetermined bail-out threshold is not reached, in step 218, the server computer reads the data for the mismatched segment from the baseline file and stores the segment data in a baseline buffer 95 (FIG. 2) in the memory of the server computer. In step 220, the server computer requests that the client computer send the data for the mismatched client segment from the modified file to the server computer. In step 222, the server computer transfers or copies the client segment that was sent from the modified file into the destination file on the server. The server computer also stores the client segment in a client segment buffer 95 (FIG. 2) in the memory of the server computer. In step 224, the server computer compares the data of the mismatched baseline and client segments stored in the baseline and client segment buffers, respectively, to determine an adjustment factor between the mismatched segments using a comparison procedure. The adjustment factor represents the number of bytes inserted and deleted in the client segment with respect to the baseline segment. The adjustment factor is used to attempt to realign the subsequent segments and metasegments of the baseline and modified files.

In step 226, the server computer increments the segment counter. In step 228, the server computer adds the adjustment factor to the file offset of the baseline segment array to generate an adjusted baseline segment array, beginning at the segment pointed to by the segment counter, to adjust the starting position of the baseline data in the segments.

In step 230, the server computer redetermines or regenerates the CRC values for the adjusted segments in the adjusted baseline segment array, beginning at the segment pointed to by the segment counter. In one embodiment, the server computer completely recalculates the CRC value for the subsequent segments using all data associated with each new segment. In an alternate embodiment, the server computer performs a partial recalculation of the CRC value by subtracting the data that was deleted from the segment and adding the new data.

In step 232, the server computer compares the redetermined CRC value in the adjusted baseline segment array for the segment pointed to by the segment counter to the corresponding client segment pointed to by the segment counter. In step 234, if the CRC values do not match, the process restores the unadjusted baseline segment array with the original file offset and CRC values (Step 236) and proceeds to step 200. However, if the CRC values match, in step 238, the server computer applies the adjustment factor to the file offset of the subsequent uncompared metasegments in the baseline metasegment array and redetermines the associated CRC values for the adjusted metasegments. The process then proceeds to step 200.

Example of a File Transfer Using the Difference Engine

In this example, assume that the baseline file on the server has 1,011 bytes, and the modified file on the client has 1,018 bytes. The modified file differs from the baseline file as follows:

1 byte was changed at file offset 273, 4 bytes were inserted at file offset 511, 5 bytes were inserted at file offset 802, and 2 bytes were deleted at file offset 807.

The segment size or length is ten bytes, and the metasegment size is ten segments. Therefore the metasegment size or length is 100 bytes.

Table 1 below shows an exemplary baseline metasegment array that is generated in step 172 of FIG. 7A. In Table 1, the baseline file has eleven metasegments, and follows the format described above with respect to FIG. 5.

TABLE 1

A baseline metasegment array

| Metasegment No. | File Offset (bytes) | Metasegment Length (bytes) | CRC Value |
| --- | --- | --- | --- |
| 0 | 0 | 100 | 0x0123 |
| 1 | 100 | 100 | 0xF00A |
| 2 | 200 | 100 | 0xE321 |
| 3 | 300 | 100 | 0x6543 |
| 4 | 400 | 100 | 0xA001 |
| 5 | 500 | 100 | 0x0D12 |
| 6 | 600 | 100 | 0x341A |
| 7 | 700 | 100 | 0xE898 |
| 8 | 800 | 100 | 0x03AF |
| 9 | 900 | 100 | 0xD400 |
| 10 | 1000 | 11 | 0x2C94 |

Table 2 depicts the client metasegment array for the modified file that is generated in step 176 of FIG. 7A, and transferred to the server computer. In the CRC value column, the asterisk (*) indicates that this CRC value differs from the CRC value calculated in the baseline file shown in Table 1.

TABLE 2

A client metasegment array

| Metasegment No. | File Offset (bytes) | Metasegment Length (bytes) | CRC Value |
| --- | --- | --- | --- |
| 0 | 0 | 100 | 0x0123 |
| 1 | 100 | 100 | 0xF00A |
| 2 | 200 | 100 | 0xE253* |
| 3 | 300 | 100 | 0x6543 |
| 4 | 400 | 100 | 0xA001 |
| 5 | 500 | 100 | 0x8A00* |
| 6 | 600 | 100 | 0x912A* |
| 7 | 700 | 100 | 0x1234* |
| 8 | 800 | 100 | 0xE00F* |
| 9 | 900 | 100 | 0x854E* |
| 10 | 1000 | 11 | 0x160B* |

The method proceeds to step 178 where the metasegment counter is set to zero, and the segment mismatch counter is set to zero. In step 180, the server computer compares the CRC values of the baseline and client metasegment arrays for the metasegment pointed to by the metasegment counter. Step 182 determines if the CRC values match. In this example, the CRC values will match until metasegment two is reached. For those CRC values that match, the server computer transfers the data in the associated metasegment from the baseline file into the destination file (step 184). The server computer increments the metasegment counter (step 186), determines that the last metasegment has not been reached (step 188) and loops back to step 180 for the next metasegment comparison.

In this example, when the metasegment counter is equal to two, step 182 will determine that the CRC values in the baseline metasegment array and the client metasegment array for metasegment two do not match. Then, in step 192, the server computer generates a baseline segment array for the segments making up the mismatching baseline metasegment. Table 3 shows an exemplary baseline segment array.

TABLE 3

Exemplary baseline segment array

| Segment No. | File Offset (bytes) | Segment Length (bytes) | CRC Value |
|---|---|---|---|
| 0 | 200 | 10 | 0x1234 |
| 1 | 210 | 10 | 0xF302 |
| 2 | 220 | 10 | 0x4521 |
| 3 | 230 | 10 | 0x87AE |
| 4 | 240 | 10 | 0x4500 |
| 5 | 250 | 10 | 0x33EA |
| 6 | 260 | 10 | 0x9000 |
| 7 | 270 | 10 | 0x145C |
| 8 | 280 | 10 | 0x3210 |
| 9 | 290 | 10 | 0xEF12 |

In step 194, the server computer requests that the client computer generate a client segment array for the mismatching client metasegment. Table 4 below shows an exemplary client segment array.

TABLE 4

Exemplary client segment array

| Segment No. | File Offset (bytes) | Segment Length (bytes) | CRC Value |
|---|---|---|---|
| 0 | 200 | 10 | 0x1234 |
| 1 | 210 | 10 | 0xF302 |
| 2 | 220 | 10 | 0x4521 |
| 3 | 230 | 10 | 0x87AE |
| 4 | 240 | 10 | 0x4500 |
| 5 | 250 | 10 | 0x33EA |
| 6 | 260 | 10 | 0x9000 |
| 7 | 270 | 10 | 0x30AF* |
| 8 | 280 | 10 | 0x3210 |
| 9 | 290 | 10 | 0xEF12 |

Since one byte of segment seven was changed in the modified file on the client computer, only segment seven of the client segment array of Table 4 has a CRC value that is different from the CRC value for segment seven in the baseline segment array of Table 3. In step 196, the client computer sends the client segment array to the server computer. The server computer sets a segment counter equal to zero (step 198). Since the CRC values for segments zero through six match, the server computer executes steps 200, 202, 204, 206 and 208 to transfer the data in the matching segments from the baseline file into the destination file. When the segment counter reaches segment seven, step 202 determines that the CRC values do not match and proceeds to step 210.

The server computer increments the segment mismatch counter (step 210) and determines if the segment mismatch counter equals a bail-out threshold value (step 212). In this example, the segment mismatch counter is not exceeded and the server computer reads the data for the mismatched baseline segment from the baseline file and stores it in a baseline segment buffer (base_buf) (Step 218). The server computer also requests that the client computer send the data from the mismatched segment from the modified file, stores the client segment in a client segment buffer (client_buf) (Step 220) and transfers the client segment data to the destination file (step 222). In step 224, the server executes a compare procedure to compare the mismatched baseline and client segments in the baseline and client segment buffers, respectively, to determine an adjustment factor. The adjustment factor is an integer that represents a number of bytes in which the data in the baseline file has shifted or moved or been repositioned with respect to the data in the modified file. The adjustment factor represents a potential shift of the data. The technique for determining the adjustment factor will be discussed in further detail below with respect to FIGS. 8 and 9.

In this example, in step 224, the compare procedure returns a value of zero for the adjustment factor because the byte in segment seven changed, without insertions or deletions, and therefore data was not positionally shifted between the baseline and modified files. The server computer adds the adjustment factor to the file offset of the baseline segment array (228) if the adjustment factor is valid. Since the adjustment factor is equal to zero, the file offset values and CRC values in the baseline segment array do not change (Steps 228, 230). Since the remaining segments have matching CRC values (Step 234), step 238 applies the adjustment factor and proceeds to step 200. When all segments have been compared, the metasegment counter is incremented (step 186) and the next metasegment is processed.

In this example, subsequent metasegment comparisons (steps 180, 182) have matching CRC values until metasegment five is reached because four bytes were inserted in metasegment five. In particular, step 224 returns an adjustment factor of a negative four. Tables 5 and 6, below, show the baseline segment array and the adjusted baseline segment array, respectively, for metasegment five. The file offset of Table 6 differs from the file offset of Table 5, but the CRC values for the metasegments of Tables 5 and 6 are the same.

TABLE 5

Baseline segment array for metasegment five

| Segment No. | File Offset (bytes) | Segment Length (bytes) | CRC Value |
|---|---|---|---|
| 0 | 500 | 10 | 0x1234 |
| 1 | 510 | 10 | 0xF302 |
| 2 | 520 | 10 | 0x4521 |
| 3 | 530 | 10 | 0x87AE |
| 4 | 540 | 10 | 0x4500 |
| 5 | 550 | 10 | 0x33EA |
| 6 | 560 | 10 | 0x9000 |
| 7 | 570 | 10 | 0x30AF |
| 8 | 580 | 10 | 0x3210 |
| 9 | 590 | 10 | 0xEF12 |

TABLE 6

Adjusted baseline segment array for metasegment five

| Segment No. | File Offset (bytes) | Segment Length (bytes) | CRC Value |
|---|---|---|---|
| 0 | 500 | 10 | 0x1234 |
| 1 | 510 | 10 | 0xF302 |
| 2 | 516 | 10 | 0x4521 |
| 3 | 526 | 10 | 0x87AE |
| 4 | 536 | 10 | 0x4500 |
| 5 | 546 | 10 | 0x33EA |
| 6 | 556 | 10 | 0x9000 |
| 7 | 566 | 10 | 0x30AF |
| 8 | 576 | 10 | 0x3210 |
| 9 | 586 | 10 | 0xEF12 |

Figure 7B:
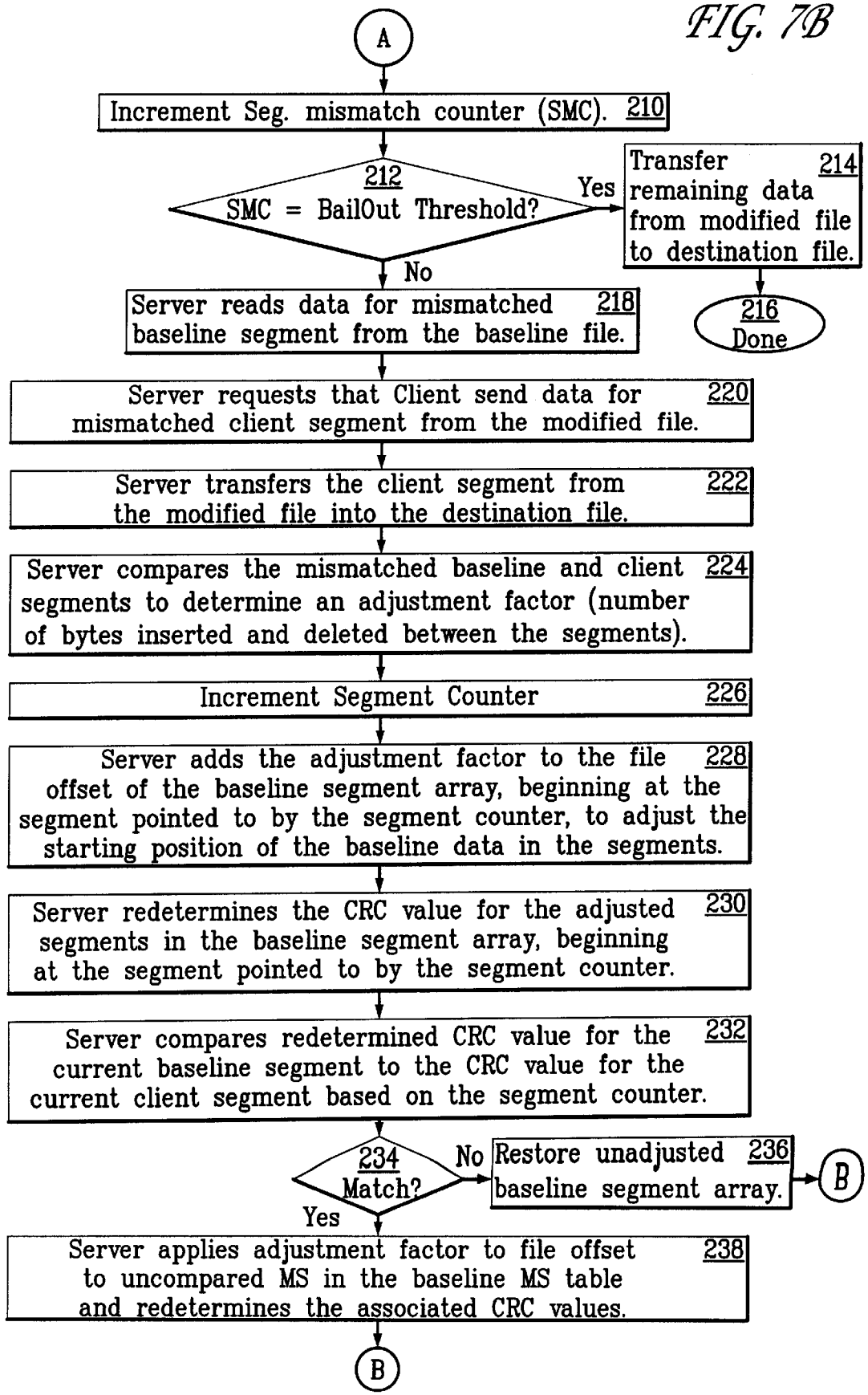
Figure 8B:
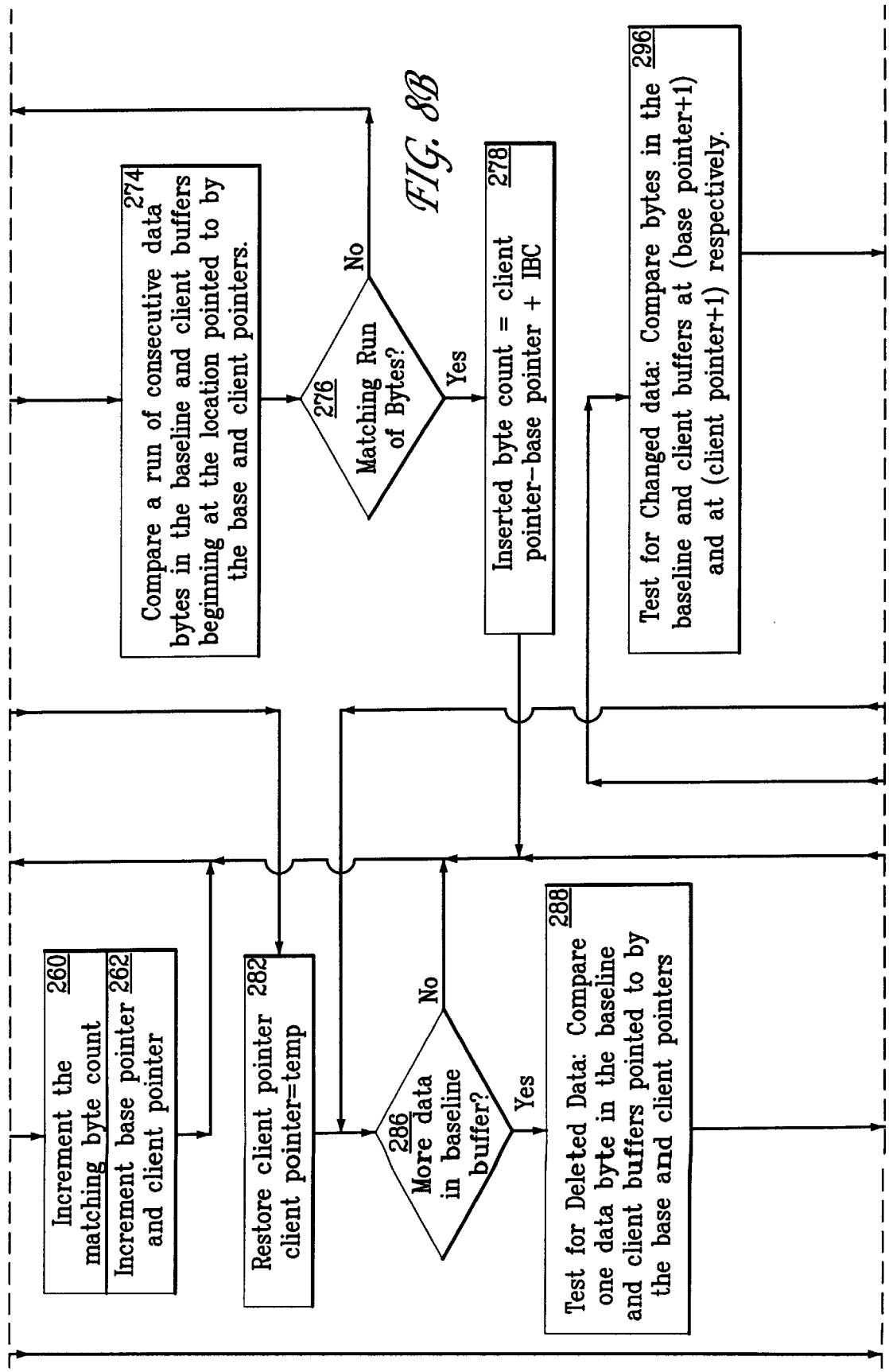

FIGS. 8A, 8B and 8C illustrate the operation of one embodiment of the compare procedure that determines the adjustment factor in step 224 of FIG. 7B. The adjustment factor is used to resynchronize the data in the segments and metasegments. The data of the baseline and client segments is stored in respective baseline and client buffers. In step 252, the data pointers, called base pointer and client pointer, are initialized to point to the start of the baseline and client buffers, respectively. A matching byte count is initialized to zero. A run length parameter is initialized to a run length configuration value read from a configuration file. The user can configure the run length configuration value. The run length is used to determine if sequences of characters match. An inserted byte count and a deleted byte count are also initialized to zero. The inserted byte count stores a value representing a number of bytes inserted into the client buffer. The deleted byte count stores a value representing a number of bytes deleted from the client buffer.

Step 254 determines if there are more data bytes to compare in the baseline buffer. If so, then step 256 compares one byte of data in the baseline and client buffers at the location pointed to by the base and client pointers, respectively. If the bytes match in step 258, the matching byte count is incremented (step 260) and the base and client pointers are incremented (step 262). Step 262 then proceeds to step 254.

In step 258, if the bytes do not match, the compare procedure determines if bytes were inserted. Step 264 saves the value of the client pointer in a temporary variable (temp). Step 266 increments the client pointer. Step 268 determines if there is more data in the client buffer to compare. If so, step 270 compares data bytes in the baseline and client buffers pointed to by the base and client pointers, respectively. In step 272, if the bytes do not match, the procedure proceeds to step 266.

However, in step 272, if the bytes match, step 274 compares a run or sequence of consecutive data bytes in the baseline and client buffers beginning at the location pointed to by the base and client pointers, respectively. The value of the run length determines the number of bytes in the sequence of consecutive data. In step 276, if the run of consecutive data bytes do not match, the procedure loops back to step 266. However, if in step 276, the run of consecutive data bytes does match, bytes were inserted and the inserted byte count is set equal to the value of the client pointer minus the value of the base pointer plus the value of the inserted byte count (IBC) (step 278). The compare procedure then branches to step 254 to find more uncompared data bytes in the baseline buffer.

However, if in step 268, there is no more data in the client buffer, the compare procedure determines if data bytes were deleted or changed in the client buffer. In step 282, the value of the client pointer is restored from the temporary variable (temp). Step 286 determines if there are more uncompared data bytes in the baseline buffer. If so, step 288 tests for deleted data by comparing the data bytes in the baseline and client buffers that are pointed to by the base and client pointers, respectively. In step 290, if the bytes match, the compare procedure has identified that bytes were deleted. In step 292, the deleted byte count is set equal to the value of the client pointer minus the value of the base pointer plus one plus the value of the deleted byte count (DBC), then proceeds to step 254.

In step 290, if the bytes do not match, step 296 performs a one byte look-ahead function and tests to see if the next data byte changed. The data byte in the baseline buffer pointed to by the value of the base pointer plus one is compared to the data byte in the client buffer pointed to by the value of the client pointer plus one. In step 298, if the bytes do not match, the compare procedure increments the base pointer (step 299) and proceeds to step 286 to continue the search for deleted bytes. However, if the bytes match, the compare procedure determines that the byte was changed, and increments the base pointer (step 300), and the proceeds to step 254.

In step 254, if there are no uncompared data bytes in the baseline buffer, the validity of setting a valid adjustment factor is determined. Step 302 compares the value stored in the matching byte count with a predetermined threshold. The predetermined threshold is equal to a validity percentage multiplied by the total number of bytes in a segment. In one implementation, the validity percentage is equal to thirty-three percent or one-third. The validity percentage is also configurable by the user. If the value stored in the matching byte count is less than the predetermined threshold, a "false" condition with no valid adjustment factor is returned (step 304). If the value stored in the matching byte count is greater than or equal to the predetermined threshold, in step 306, the adjustment factor is set equal to the value of the inserted byte count minus the value of the deleted byte count. Step 308 returns a "true" condition with the value the adjustment factor.

Figure 9:
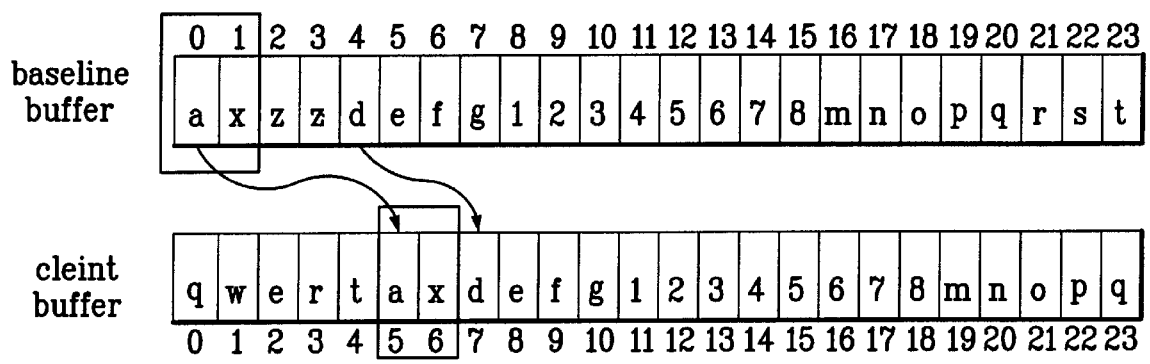
FIG. 9 illustrates the method of determining the adjustment factor using exemplary character sequences in a baseline segment buffer (base_buf) and a client segment buffer (client_buf).

Referring to FIG. 9, the operation of the compare procedure to determine the number of inserted and deleted bytes will now be explained. FIG. 9 illustrates exemplary character sequences in the baseline buffer and the client buffer. The top sequence of cells represents the baseline buffer and the bottom sequence of cells represents the client buffer. Each cell stores a byte. The numbers either above or below the cells in the baseline buffer represents the location of the cell. For example, a buffer pointer with a value of zero points to the first byte, an "a". The run length is equal to two.

Referring also to FIGS. 8A, 8B and 8C, steps 252, 254 and 256 are executed. At this point, the base and client pointers have a value of zero. In step 258, the byte of the baseline buffer at location zero, which equals "a," does not match the byte of the client buffer at location zero, which equals "q." Since "a" does not equal "q," the compare procedure saves the value of the client pointer (step 264), increments the client pointer (step 266), determines that there is more data in the client buffer is not reached (step 268), and compares the byte pointed to in the baseline buffer by base pointer to the byte in the client buffer pointed to by the client pointer (step 270). In step 272, since the "a" of the baseline buffer does not equal the "w" of the client buffer, the compare procedure proceeds to step 266 and increments the client pointer. The process repeats until the client pointer has a value equal to five, when in step 272, the baseline buffer byte, an "a," matches the client buffer byte, an "a". In step 274, since the run length is equal to two, the string "ax" from the baseline buffer is compared to the string "ax" in the client buffer. Since the strings match (step 276), step 278 sets the value of the inserted byte count to be equal to the value of the inserted byte count, zero, plus the value of the client pointer, five, minus the value of the baseline pointer, zero, resulting in the inserted byte count having a value of five.

Next, in step 254, there is more data in the baseline buffer. Step 256 compares the byte of data in the baseline buffer, "a", with the byte of data in the client buffer, "a". Step 258 determines that the bytes match. Step 260 increments the matching byte count to equal one. The base and client pointers are incremented such that the base pointer has a value of one and the client pointer has a value of six.

The compare procedure then proceeds to execute steps 254 and 256. Step 258 again determines that the baseline buffer and client buffer both have and "x" at the pointer locations. Step 260 increments the matching byte count to have a value of two. Step 262 increments the base and client points, such that the base pointer has a value of two and the client pointer has a value of seven.

Steps 254 and 256 are executed, step 258 determines that the "z" at position two in the baseline buffer does not match the "d" at position seven in the client buffer and proceeds to step 264. Steps 266 through 272 are repeatedly executed and no match is found.

At step 268, the client pointer has been incremented beyond the length of the client buffer and the compare procedure proceeds to step 282 to determine if bytes were deleted. In step 282, the value of the client pointer is restored from the temporary variable, and the client pointer has a value of seven. Note that the base pointer, which points into the baseline buffer, has a value of two. In step 286, there is more data in the baseline buffer. Steps 288 and 290 determine that the "z" at position two in the baseline buffer does not match the "d" at position seven of the client buffer. In step 296, a one by look-ahead is performed to determine if a byte was deleted or changed. The "z" at position three in the baseline buffer is compared to the "e" at position eight of the client buffer. In step 298, since the "z" and "e" do not match, the compare procedure determined that a byte was deleted. The base pointer is incremented to three (step 299) and the compare procedure proceeds to step 286. In step 288, the "z" at position three of the baseline buffer is compared to the "d" at position seven of the client buffer. Since the "z" and "d" do not match, in step 296, the "d" at position four in the baseline buffer is compared to the "d" at position seven in the client buffer. In step 298, the bytes are determined to match, and step 300 increments the base pointer which now has a value of four. Step 286 determines that there is more data in the baseline buffer. In step 288, the "d" at position four in the baseline buffer is compared to the "d" at position seven in the client buffer. Step 290 determines that the bytes match. Step 292 updates the deleted byte count. The deleted byte count is equal to the value of the deleted byte count, zero, plus the value of the base pointer, four, minus the value of the client pointer, seven, plus one, resulting in the deleted byte count having a value of two. The compare procedure then returns to step 254 to search for more inserted sequences and the process repeats.

In an alternate embodiment, the deleted byte count is determined using counters instead of pointers. Those skilled in the art will recognize that a temporary variable can store a count of miscompared bytes which is used to update the deleted byte count.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of transferring a file, executed by a client computer under control of a first program portion and also executed by a server computer under control of a second program portion, said server computer storing a baseline file having baseline data, said client computer storing a local file that is a modified baseline file having modified data, said client computer being coupled to said server computer, said method comprising the steps of:

(a) generating and associating first tier baseline reference keys for first tier subsets of said baseline data stored in said baseline file using a predetermined key defining method to generate said first tier baseline reference keys from at least a portion of said associated first tier subset of said baseline data;

(b) generating and associating first tier client reference keys for first tier subsets of said modified data stored in said local file using said key defining method to generate said first tier of client reference keys from at least a portion of said associated first tier subset of said modified data;

(c) transferring one of said first tier subsets of baseline data to a destination file stored on said server computer when said associated first tier baseline reference key and said associated first tier client reference key match;

(d) generating and associating at least one second tier baseline reference key for at least one second tier baseline subset of one of said first tier subsets of said baseline data, and also generating and associating at least one second tier client reference key for at least one second tier client subset of one of said first tier subsets of said modified data, when said associated first tier baseline reference key and said associated first tier client reference key do not match; and (e) transferring said at least one second tier baseline subset or said at least one second tier client subset to said destination file, based on said associated second tier baseline reference key and said associated second tier client reference key.

2. The method of claim 1 wherein said step (e) of transferring includes the steps of:

transferring said at least one second tier baseline subset to said destination file, when said associated second tier baseline reference key and said associated second tier client reference key match; and transferring said at least one second tier client subset to said destination file, when said associated second tier baseline reference key and said associated second tier client reference key do not match.

3. The method of claim 2 further comprising the steps of:

(f) determining an offset by comparing said at least one second tier baseline subset and said at least one second tier client subset associated with said non matching second tier baseline and client reference keys;

(g) regenerating said at least one second tier baseline reference key for a portion of said at least one second tier baseline subsets by applying said offset to redefine the portions of baseline data associated with the second tier baseline reference key;

(h) comparing said at least one second tier baseline reference key to said at least one second tier client reference key;

(i) regenerating said first tier baseline reference keys for a portion of said first tier subsets of said baseline data by applying said offset to redefine the portions of the baseline data associated with the first tier baseline reference keys, when said at least one second tier baseline reference key matches said at least one second tier client reference key; and (j) repeating said steps (c), (d) and (e).

4. The method of claim 1 wherein said first tier subsets of said baseline data are mutually exclusive and said first tier subsets of said modified data are mutually exclusive.

5. The method of claim 1 wherein said first tier subsets are metasegments, and said second tier baseline subsets and said second tier client subsets are segments.

6. The method of claim 1 wherein said step (d) of generating and associated at least one second tier baseline reference key uses said key defining method to generate said at least one second tier baseline reference key from at least a portion of said associated second tier baseline subsets.

7. The method of claim 1 wherein said predetermined key defining method generates a cyclic redundancy code.

8. The method of claim 1 wherein said predetermined key defining method is digital signature encryption.

9. The method of claim 8 wherein said digital signature encryption is a message digest algorithm.

10. The method of claim 1 further comprising the steps of:
(f) transferring only a portion of said modified data from said local file to said destination file, if a predetermined number of said second tier baseline reference keys and second tier client reference keys do not match.

11. The method of claim 1 wherein said server is a mass storage subsystem.

12. A method executed by a client computer under control of a program and also executed by a server computer under control of another program, said server computer storing a baseline file, said client computer storing a local file that is a modified baseline file, said client computer being coupled to said server computer, said method comprising the steps of:
in said server computer,
generating and associating a baseline set of baseline reference keys for a plurality of metasegments of said baseline file using a key defining method that generates said baseline reference keys from at least a portion of said baseline data;
in said client computer,
generating and associating a client set of client reference keys for a plurality of metasegments of said local file using said key defining method;
transferring said client set of client reference keys to said server computer;
in said server computer,
comparing at least one transferred client reference key with at least one baseline reference key;
when said transferred reference key matches said baseline reference key, said server computer copies said metasegment associated with said matched baseline reference key to a destination file on said server computer;
when said transferred reference key does not match said baseline reference key,
said server computer generates a baseline segment set of baseline segment reference keys, a baseline segment reference key being generated for and associated with each segment of said associated metasegment of said non-matching baseline reference key;
said server computer requests said client computer to generate a client segment set of client segment reference keys for said metasegment associated with said non-matching transferred reference key;
in said client computer,
said client computer generates said client segment set of client segment reference keys, one's of said client segment reference key being generated for and associated with one's of said segments;
transferring said client segment set of client segment reference keys to said server computer;
in said server computer,
comparing at least one transferred client segment reference key with at least one baseline segment reference key;
when said at least one transferred client segment reference key matches said at least one baseline segment reference key, transferring said segment associated with said matched at least one baseline segment reference key from said baseline file to said destination file;
when said at least one transferred client segment reference key does not match said at least one baseline segment reference key, transferring said segment associated with said non-matching at least one client segment reference key from said local file on said client to said destination file on said server computer;
determining an offset by comparing said transferred segment associated with said non-matching at least one client reference key to said segment associated with said non-matching baseline segment reference key;
re-generating said baseline segment reference keys for said uncompared baseline segment reference keys by applying said offset to redefine said segments associated with said uncompared baseline segment reference keys;
comparing at least one of said regenerated baseline segment reference keys to at least one uncompared client segment reference key;
when said at least one compared regenerated baseline segment reference key matches said uncompared base segment reference key, re-generating said baseline reference keys for uncompared baseline metasegments by applying said offset to redefine said metasegments associated with said uncompared baseline segment reference keys; and
repeating from said step of comparing at least one transferred client reference key with at least one baseline reference key, in said server computer.

13. A computer readable memory to direct a computer to function in a specified manner, comprising:
a first module to generate and associate first tier baseline reference keys for first tier subsets of a baseline data stored in a baseline file using a predetermined key defining method to generate said first tier baseline reference keys from at least a portion of said associated first tier subset of said baseline data;
a second module to generate and associate first tier client reference keys for first tier subsets of a modified data stored in a local file using said key defining method to generate said first tier of client reference keys from at least a portion of said associated first tier subset of said modified data;
a third module to transfer one of said first tier subsets of baseline data to a destination file stored on a server computer when said associated first tier baseline reference key and said associated first tier client reference key match;
a fourth module to generate and associate at least one second tier baseline reference key for at least one second tier baseline subset of one of said first tier subsets of said baseline data, and also to generate and associate at least one second tier client reference key for at least one second tier client subset of one of said first tier subsets of said modified data, when said associated first tier baseline reference key and said associated first tier client reference key do not match; and
a fifth module to transfer said at least one second tier baseline subset or said at least one second tier client subset to said destination file, based on said associated second tier baseline reference key and said associated second tier client reference key.

14. The computer readable memory of claim 13 wherein said fifth module includes modules to:

transfer said at least one second tier baseline subset to said destination file, when said associated second tier baseline reference key and said associated second tier client reference key match; and transfer said at least one second tier client subset to said destination file, when said associated second tier baseline reference key and said associated second tier client reference key do not match.

15. The computer readable memory of claim 13 further comprising:

a sixth module to determine an offset by comparing said at least one second tier baseline subset and said at least one second tier client subset associated with said non matching second tier baseline and client reference keys;

a seventh module to regenerate said at least one second tier baseline reference key for a portion of said at least one second tier baseline subsets by applying said offset to redefine the portions of baseline data associated with the second tier baseline reference key;

an eighth module to compare at least one of said at least one second tier baseline reference key to at least one of said at least one second tier client reference key;

a ninth module to regenerate said first tier baseline reference keys for a portion of said first tier subsets of said baseline data by applying said offset to redefine the portions of the baseline data associated with the first tier baseline reference keys, when said at least one second tier baseline reference key matches said at least one second tier client reference key; and a tenth module to cause said third, fourth and fifth modules to repeatedly execute.

16. The computer readable memory of claim 13 wherein said first tier subsets of said baseline data are mutually exclusive and said first tier subsets of said modified data are mutually exclusive.

17. The computer readable memory of claim 13 wherein said first tier subsets are metasegments, and said second tier baseline subsets and said second tier client subsets are segments.

18. The computer readable memory of claim 13 wherein said fourth module uses said key defining method to generate said at least one second tier baseline segment reference key from at least a portion of said associated second tier baseline subsets.

19. The computer readable memory of claim 13 wherein said predetermined key defining method generates a cyclic redundancy code.

20. The computer readable memory of claim 13 wherein said predetermined key defining method is digital signature encryption.

* * * * *